3,759,789
PROCESS FOR THE MICROBIAL PRODUCTION OF LYSINE AND ISOLEUCINE
Kiyoshi Watanabe, Akashi, Tutomu Tanaka, Kobe, Tamotsu Hirakawa, Kakogawa, and Mamoru Sasaki, Kobe, Japan, assignors to Kanegafuchi Kagaku Kogyo Kabushiki Kaisha, Osaka, Japan
No Drawing. Filed Mar. 17, 1971, Ser. No. 125,353
Claims priority, application Japan, Dec. 28, 1970, 46/128,964
Int. Cl. C12b 1/00
U.S. Cl. 195—28 R      20 Claims

ABSTRACT OF THE DISCLOSURE

A process for producing L-lysine and L-isoleucine which comprises cultivating a threonine resistant mutant strain of Arthrobacter alkanicus (Arthobacter alkanicus No. 109) (ATCC No. 21657), under aerobic conditions in an aqueous nutrient medium containing assimilable carbon sources such as hydrocarbons, fatty acids, organic acids or alcohols, and surface active agents such as polyoxyethylene-sorbitan mono-oleate or polyoxyethylene-sorbitane tri-oleate, and accumulating L-lysine and L-isoleucine in the resultant culture liquor.

DISCLOSURE

The present invention relates to a process for producing L-lysine and L-isoleucine.

An object of this invention is to provide a high yield process for producing L-lysine and L-isoleucine, which are indispensable amino acids, from the cheap raw materials using threonine-resistant mutant of Arthrobacter alkanicus (Arthrobacter alkanicus No. 109) (ATCC No. 21657) derived from the threonine-sensitive mutant. (Available without our consent from ATCC, Washington, D.C.)

L-lysine is an indispensable amino acid which is important as the nutrition for men and animals and also is known as the first limiting amino acid of cereals which are a staple food for more than half of the population in the world. Thus, it has long been desired to produce such lysine with a low cost.

Many processes have already been known about the production of L-lysine by fermentation. For example, there is a process wherein a homoserine or threonine and methionine requiring mutant (see, Japanese patent publication No. 6499/'61), a lysine analogue resistant strain (see, Journal of Gen. Appl. Microbiol.; 16, 373–391 (1970)), or a threonine- or methionine-sensitive strain (Journal of Gen. Appl. Microbiol.; 15, 267–287 (1969)) is cultivated using sugar as the raw material, whereby L-lysine is accumulated in the culture medium, and then the L-lysine is recovered. Also, as the process for producing L-lysine using hydrocarbons as the carbon sources, there is known a process of using a homoserine requiring strain of a bacterium belonging to Brevibacterium, Arthrobacter, Corynabacterium, or Micrococcus paraffinolyticus (see, Japanese patent publication No. 14,789/'69).

The inventors have discovered that one strain among the mutants of Arthrobacter alkanicus accumulates a slight amount of L-lysine in a culture medium. The strain mentioned above has such specific property that it can not grow when L-threonine is present (threonine sensitivity). Furthermore, it has been confirmed that by subjecting the threonine-sensitive strain thus obtained to a mutagenic treatment to increase stepwise the resistance thereof to L-threonine, the yield of L-lysine is remarkably increased and at the same time L-isoleucine, an indispensable amino acid is accumulated.

As mentioned above, it is known that the threonine-sensitive bacterium belonging to Brevibacterium can accumulate L-lysine using sugar as the raw material but a phenomenon has not yet been known that a threonine resistant strain derived from the threonine-sensitive strain produces remarkably L-lysine and L-isoleucine by using inexpensive hydrocarbons as the raw materials. As the results of inoculating the mutant having the above-mentioned property in culture medium using hydrocarbons and investigating the cultivation conditions, the inventors have found that surface active agents such as polyoxyethylene sorbitan mono-oleate or polyoxyethylene sorbitan tri-oleate promotes remarkably the productions of L-lysine and L-isoleucine.

As mentioned above, the invention relates to a process for producing L-lysine and L-isoleucine by using microorganisms belong to Arthrobacter alkanicus and the features of the process of this invention superior to conventional processes are as follows:

(1) The process of the present invention uses a threonine-resistant strain derived from a threonine-sensitive strain of Arthrobacter alkanicus which is able to assimilate hydrocarbons, fatty acids and organic acids. The wild or mutant strain of Arthrobacter alkanicus cannot grow on generally assimilable carbon sources such as glucose, xylose and glycerin.

(2) The strain to be used in the process of this invention does not require specific nutrients such as vitamins, amino acids, pyrines and pyrimidines and by using the strain, L-lysine and L-isoleucine can be produced with good yields in a simple synthetic culture medium containing inexpensive hydrocarbons.

(3) By adding polyoxyethylene sorbitan mono-oleate or tri-oleate to the culture medium according to this invention, the yields for L-lysine and L-isoleucine increase remarkably and the yield of L-lysine for the consumed carbon sources reaches 20–25%.

(4) By the addition of aspartic acid which is a precursor, the yields of L-lysine and L-isoleucine increase remarkably.

Now, the invention will be explained below in detail.

The microorganisms to be used in the present invention are bacteria belong to Arthrobacter having a faculty of assimilating hydrocarbons and can be obtained from a natural resource such as soil by a so-called enrichment method using hydrocarbons as the carbon sources. Among these bacteria, Arthrobacter alkanicus is a strain newly separated from soil by the inventors and has the following properties:

(1) Shape: Rod of $0.5-1.0\mu \times 1.0-6.0\mu$. When the cultivation proceeds, the proportion of coccus increases.
(2) Gram staining: Mainly negative.
(3) Motility property: None.
(4) Endospore: None.
(5) Acid fast staining: Negative.
(6) Metachromatic granule: Almost none.
(7) Colony on an ordinary agar plate (33° C., 1 day): Milky white, circular shape, 0.5–1.0 mm., flat, glossy, opaque, slightly greyish white. Irritating odor and some of it produces a brown dissolved dye in a culture medium enriched with a nitrogen source.
(8) Liquid cultivation (33° C., 1–3 days): Almost no surface growth. Moderately turbid and some grew granularly. Precipitation.
(9) Potato cultivation (33° C., 3–10 days): Gray-white to faint gray-brown and grew thinly. Glossy and smooth.
(10) Gelatin stab cultivation (20° C.): Gradually dissolved in crateriform. Growth on the surface but no growth inside.

(11) Litmus milk (33° C., 6-35 days): Coagulated at moderate to weak acidity and the upper layer became transparent. Some became brown-blue.

(12) Hydroylsis of starch (33° C., 1-10 days): Negative.

(13) Indol formation: Negative.

(14) Formation of nitrite: Weakly positive.

(15) Formation of hydrogen sulfide: Weakly positive.

(16) Formation of acid from sugar: Acids are not formed from dextrose, lactose, fructose, galactose, mannose, xylose, arabinose, ribose, maltose, mannitol, glycerine, and cellulose.

(17) Assimilation of carbon sources: Citric acid, fumaric acid, succinic acid, oxaloacetic acid, pyruvic acid, acid, acetic acid, malic acid, crotonic acid, α-ketoglutaric acid, maleic acid, ethanol, propyl alcohol, tridecane, tetradecane, pentadecane, hexadecane, heptadecane, octadecane, and nonadecane are assimilated. Phenol, dextrose, xylose, glycerine, and lactic acid are not assimilated.

(18) Utilization of nitrogen source: An ammonium salt or a nitrate is utilized as the nitrogen source.

(19) Catalase: Positive.

(20) Aerobic.

(21) Optimum temperature: 30-36° C.

(22) Separation source: Soil.

As the results of investigating the above-mentioned various properties according to the methods described in Bergey's, Manual of Determinative Bacteriology, 7th edition, it has been confirmed that the *Arthrobacter alkanicus* is clearly a strain belonging to Arthrobacter but from the facts that the strain is different from such known strains as *Arthrobacter simplex* and *Arthrobacter ureafaciens* in the points of the reaction of litmus milk, the strain has been determined as a new strain (see, Japanese patent publication No. 438/'70).

The inventors have found a strain producing L-lysine in the steps of aerobically cultivating in a culture medium containing hydrocarbons as the main carbon sources the strain obtained by subjecting the hydrocarbon-assimilating bacteria to a mutation treatment and then investigating the amino acids accumulated in the culture medium. The strain thus found has a property that it does not grow in the presence of threonine (threonine sensitivity). When the strain is further subjected repeatedly the mutation treatment and the strain which can grow in the presence of threonine of a higher concentration (threonine resistance strain) is selected and cultivated, it has been confirmed that the production of L-lysine is greatly increased and further L-isoleucine is produced. The relations of the level of threonine resistance and the faculty of producing L-lysine and L-isoleucine are shown in the following table, in which the strains below No. 45 are ones systematically selected using strain No. 57 as the original strain.

TABLE 1

| Strain | Concn. of threonine inhibiting the growth,[1] mg./ml. | L-lysine | L-isoleucine[2] |
|---|---|---|---|
| 57 ↓ | 0.05~0.10 | 0.5 | 0 |
| 45 ↓ | | 0.2 | 2.4 | 0 |
| 85 ↓ | 0.3~0.4 | 5.8 | 2.4 |
| 71 ↓ | 0.3~0.4 | 4.5 | 4.2 |
| 50 ↓ | 1~2 | 9.8 | 2.4 |
| 21 ↓ | 2~5 | 16.0 | 2.3 |
| 109 (ATCC, No. 21657) | <20 | 22.0 | 3.1 |

[1] Culture medium for growing test: 0.5% n-paraffin, 0.6% ammonium sulfate, 0.1% NaCl, 0.04% MgSO$_4$.7H$_2$O, 0.01% CaCl$_2$, 0.01% FeSO$_4$.17H$_2$O, 0.0002% MnSO$_4$.4H$_2$O, and 75% H$_3$PO$_4$ 12 ml./liter (pH adjusted to 7.0 with KOH). Shaking culture at 33° C. for 48 hrs.
[2] Production culture medium: 10% n-paraffin, 3.0% ammonium sulfate, 0.1% K$_2$HPO$_4$, 0.1% KH$_2$PO$_4$, 0.1% MgSO$_4$.7H$_2$O, 0.01% FeSO$_4$.7H$_2$O, 0.001% MnSO$_4$, 0.1% polyoxyethylene sorbitane trioleate, 3.0% CaCO$_3$ (pH 7.0). In a 500 ml. flask was placed 30 ml. of the culture medium and after sterilization and inoculation, the shaking cultivation was conducted for 7 days at 33° C.

As clear from the above table, it will be understood the amount of L-lysine produced by the threonine-sensitive strain is slight and also L-lysine and L-isoleucine are produced in large quantities by giving the threonine resistance to the strain by the mutation treatment.

The presence of complicated control mechanisms is known in the microbial production of L-lysine. For example, a phenomenon that by the presence of threonine, the aspartokinase in the biosynthetic pathway common to L-lysine and L-threonine is inhibited, whereby the productions of L-lysine and L-threonine are inhibited, that is a feedback inhibition by threonine, has been confirmed in various microorganisms.

On the other hand, in the process of this invention, the feedback inhibition by threonine is weakened by strengthening the threonine resistance of the strain, which may result in increasing the production of L-lysine and L-isoleucine. This will be understood by referring the knowledge in regard to the biosynthesis pathway of amino acid shown in FIG. 1 shown below.

FIG. 1: Biosynthetic pathway and control mechanism of some amino acids (particularly described, the mechanism known in *Esherichia coli*, etc.)

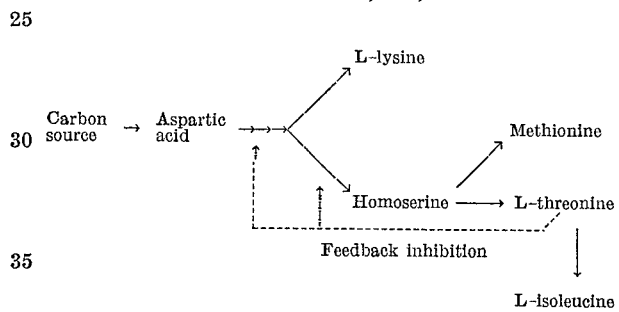

The mutants having the above properties may be readily obtained by skilled persons in the field by applying mutation-techniques using various mutageous methods, for example, irradiations of ultraviolet rays, X-rays or gamma rays or a treatment with a chemical agent. For example, the threonine-sensitive strain can be comparatively readily obtained by breeding microorganisms in a minimal culture medium after treating with a chemical agent such as, e.g., N-methyl-N'-nitro-N-nitroso-guanidine and then cultivating further in a minimal culture medium containing threonine under the presence of penicillin, whereby wild strains are killed by penicillin and the threonine-sensitive strain is concentrated. When the threonine-sensitive strain is further subjected to a mutation treatment, cultivated in a minimal culture medium containing L-threonine, and a microorganism thus grown is recovered, the threonine resistant strain is obtained. In order to increase the threonine resistance, the mutation treatment is further applied repeatedly and the strain which can grow in the presence of higher concentration of L-threonine is selected. In the microorganisms thus selected, strains which can produce L-lysine with a high yield are found.

As the culture medium composition to be used in the present invention, synthetic culture mediums or organic culture mediums containing proper amounts of carbon sources, nitrogen sources, inorganic materials and other nutrients may be effectively used. That is, as the carbon sources, there may be employed *Arthrobacter alkanicus*-assimilating hydrocarbon such as n-paraffin, kerosene and the like; an organic acid such as citric acid, fumaric acid, malic acid, acetic acid, pyruvic acid, crotonic acid, maleic acid, α-ketoglutaric acid, and the like; and alcohol such as ethanol, propyl alcohol and the like; and a higher fatty acid having 10-20 carbon atoms. As the aforesaid n-paraffin, one having 10-20 carbon atoms is used but when n-paraffin having 13-18 carbon atoms is used, a better yield for the production of L-lysine can be obtained. The carbon sources mentioned above may be used either as a single raw material or a mixture of two or more.

As the nitrogen sources, ammonia and various kinds of inorganic or organic ammonium salts such as ammonium chloride, ammonium sulfate, ammonium nitrate, ammonium carbonate, ammonium phosphate, ammonium acetate, etc., may be used. Also, as the aforesaid inorganic materials, potassium dihydrogen phosphate, dipotassium hydrogen phosphate, magnesium sulfate, ferrous sulfate, manganese sulfate, calcium carbonate, etc., may be employed.

The addition of a slight amount of an organic nitrogen source such as peptone, meat extract, yeast extract, cornsteep liquor, casein hydrolysates, etc., or methionine is effective for the stabilization of the fermentation. Moreover, when aspartic acid which is a precursor of lysine is added, the yield is greatly improved. In this case, it is necessary to add the additive during the cultivation.

Furthermore, in case of using hydrocarbons as the carbon sources, the yields of L-lysine and L-isoleucine are greatly increased by adding about 0.02–0.2%, preferably about 0.5–0.1% of polyoxyethylene sorbitan mono- or tri-oleate known as nonionic surface active agents.

The addition of surface active agents to culture medium in the fermentation using hydrocarbons as the carbon sources has hitherto been investigated by various workers from the points of improving the dispersibility of the hydrocarbons which are hydrophobic in water and promoting the utilization of the hydrocarbons by microorganisms, but the phenomenon of increasing specifically the production yields of L-lysine and L-isoleucine by the addition of surface active agents has not yet been known.

The fermentation is conducted under aerobic conditions such as by shaking cultivation or aerated submerged cultivation. The cultivation temperature is from 20° C. to 40° C. and also the pH of the culture medium during cultivation is required to be controlled to 5.5–8.0. As the neutralizing agent for the control of the pH of the culture medium, aqueous ammonia, sodium hydroxide, potassium hydroxide or calcium carbonate may be used. By conducting the cultivation for 2–8 days, L-lysine and L-isoleucine are accumulated in the culture medium. It is observed that L-isoleucine thus formed tends to decompose at the later period of the cultivation.

After the end of the cultivation, the strains are removed, the product liquid is passed through a strongly acidic cation-exchange resin to adsorb the amino acids produced on the resin, the amino acids are eluted by diluted aqueous amonia, and after removing ammonia from the elute, it is passed through a weak acidic cation-exchange resin. By the addition of alcohol (ethanol) after the concentration of the effluent, the crude crystal of L-isoleucine is obtained. When the elute by the diluted aqueous ammonia in the above procedure is concentrated and the pH thereof is adjusted to 2.0 with hydrochloric acid, the crystal of L-lysine hydrochloride is obtained.

The invention will, now, be explained by the following examples.

EXAMPLE 1

In a 500 ml. flask were charged 30 ml. of a culture medium containing 10% n-paraffins (a mixture of n-paraffins having 13–18 carbon atoms), 3.0% ammonium sulfate, 0.1% $MgSO_4.7H_2O$, 0.1% $K_2HPO_4$, 0.1% $KH_2PO_4$, 3% $CaCO_3$, 0.01% ferrous sulfate, 0.001% manganese sulfate, and 0.001% zinc sulfate (pH 7.0) and after adding various surface active agents, the culture medium was sterilized at 120° C. for 15 minutes. *Arthrobacter alkanicus* No. 109 (ATCC No. 21657) cultivated in a bouillon agar slant at 33° C. for 24 hours was inoculated in the above-mentioned flask medium. After shaking culture at 33° C. for 7 days, L-lysine and L-isoleucine were quantitatively analyzed by means of bioassay method, and the results are shown in Table 2.

TABLE 2

| | L-lysine (HCl) (g./l.) | L-isoleucine (g./l.) |
|---|---|---|
| 1. No addition | 5.6 | 0.2 |
| 2. Polyoxyethylene sorbitan mono-oleate | 20.2 | 1.2 |
| 3. Polyoxyethylene sorbitan tri-oleate | 21.5 | 2.5 |

EXAMPLE 2

A seed culture medium was prepared by dissolving 10 g. of n-paraffins, 6 g. of $(NH_4)_2SO_4$, 12 ml. of 75% $H_3PO_4$, 0.2 g. of $MgSO_4.7H_2O$, 0.1 g. of $FeSO_4.7H_2O$, 0.1 g. of $CaCl_2.2HO$, 0.03 g. of $ZnSO_4.7H_2O$, and 0.002 g. of $MnSO_4.7H_2O$ to make the whole volume to one liter. The pH of the solution was adjusted to 7.0 by adding thereto about 14 g. of KOH.

In a 2 liter flask were charged 500 ml. of the seed culture medium prepared above and after inoculating *Arthrobacter alkanicus* No. 109, the system was subjected to a shaking cultivation for 24 hours.

In a 30 liter jar fermenter were charged 18 liters of the culture medium as shown in Example 1 (containing 0.05% polyoxyethylene sorbitan tri-oleate) and the culture medium was sterilized at 120° C. for 15 minutes. The base culture medium was inoculated by 600 ml. of the seed culture and the cultivation was conducted at 33° C., at a rotation speed of 700 r.p.m., and an air passing rate of 30 liters per minute. The cultivation was finished after 60 hours and the amounts of L-lysine and L-isoleucine thus accumulated were 13.6 and 5.5 g./liter respectively.

After removing the microorganisms from the cultivated liquid by means of a centrifugal separation, 10 liters of the cultivated liquid were passed through Amberlite IR–120 (H-type) to adsorb the bath amino acids produced on the ion-exchange resin. The amino acids were eluted by 2.0 N aqueous ammonia, the elutes having ninhydrin positive fractions of the elutes were collected, and they were concentrated under a reduced pressure. Thereafter, the concentrated elute was passed through a weak acidic cation-exchange resin, Amberlite IRC–50. By the addition of alcohol after concentration the effluents, 43 g. of the crude crystal of L-isoleucine were obtained. After washing the resin (Amberlite IRC–50) with water, the amino acids adsorbed thereon were eluted by 0.15 N aqueous ammonia, and the ninhydrin-positive elutes were collected. When the pH of the mixture was adjusted with hydrochloric acid after removing therefrom ammonia, and the mixture was concentrated, 105 g. of L-lysine hydrochloride were obtained.

EXAMPLE 3

In a 500 ml. flask was charged the base culture medium as in Example 1 (containing 0.1% polyoxyethylene sorbitan tri-oleate) and the culture medium was sterilized. The culture medium was then inoculated with *Arthrobacter alkanicus* No. 109 and subjected to a shaking cultivation at 33° C. In this case, aspartic acid sterilized preliminary was added thereto at the beginning of the cultivation, after 48 hours, or after 72 hours so that the concentration thereof became 1%. The amount of L-lysine accumulated after 7 days in the culture medium was as follows:

| | Amount of L-lysine g./liter |
|---|---|
| No addition (control) | 22.5 |
| Aspartic acid added 0 hr. | 20.4 |
| Aspartic acid after 48 hrs. | 25.0 |
| Aspartic acid after 72 hrs. | 25.6 |

EXAMPLE 4

When the same procedure as Example 3 was followed by using 10% kerosene instead of the n-paraffins, the amounts of L-lysine and L-isoleucine accumulated after 6 days were 2.4 g./liter and 0.5 g./liter respectively.

EXAMPLE 5

When the same procedure as Example 3 was followed by using ethanol as the carbon source, the amounts of L-lysine and L-isoleucine were 6.0 g./liter and 2.1 g./liter respectively. In this case, ethanol was added in divided states and the total amount thereof was 50 g./liter.

EXAMPLE 6

When the same procedure as Example 3 (surface active agent and CaCO$_3$ were omitted) was followed by using stearic acid, oleic acid and palmitic acid, the concentration of L-lysine and L-isoleucine accumulated were 3,5 and 0.5 g./liter for stearic acid, 5.2 and 0.7 g./liter for oleic acid, 3.0 and 0.4 g./liter for stearic acid respectively. During the fermentation pH was adjusted to 6.0–7.5 with aqueous sodium hydroxide and sulfuric acid. Total amount of the fatty acids added was 40 g./liter.

What we claim is:

1. A process for producing L-lysine and L-isoleucine which comprises mutating substantially threonine sensitive *Arthrobacter alkanicus* to produce a threonine-resistant mutant *Arthrobacter alkanicus* No. 109, ATCC No. 21657, said mutant being capable of growing in a medium containing a high concentration of threonine; cultivating said threonine-resistant mutant *Arthrobacter alkanicus* No. 109 ATCC No. 21657 under aerobic conditions in an aqueous nutrient medium containing assimilable carbon sources, and accumulating L-lysine and L-isoleucine in the resultant culture liquor.

2. The process of claim 1, wherein said assimilable carbon sources are selected from the group of crude hydrocarbons and straight-chain hydrocarbons having from 10 to 20 carbon atoms.

3. The process of claim 1, wherein said assimilable carbon sources are higher fatty acids having from 10 to 20 carbon atoms.

4. The process of claim 1, wherein said assimilable carbon sources are organic acids selected from the group of succinic acid, fumaric acid, aspartic acid, maleic acid, malic and α-keto-glutaric acid.

5. The process of claim 1, wherein said assimilable carbon sources are lower primary alcohols selected from the group of ethyl alcohol and propyl alcohol.

6. The process of claim 1, wherein surface active agents are added to said medium.

7. The process of claim 1, wherein L-aspartic acid is added to said medium.

8. The process of claim 1, wherein cultivation temperature is from 20 to 40° C.

9. The process of claim 1, wherein cultivation pH is from 6.0 to 8.0.

10. Process of claim 6, wherein said surface active agent is in an amount of from 0.02 to 0.2 percent by weight of said medium.

11. Process of claim 10, wherein said surface active agent is in an amount of from 0.05 to 0.1 percent by weight of said medium.

12. Process of claim 6, wherein said surface active agent is polyoxyethylene sorbitan mono-oleate or polyoxyethylene sorbitan tri-oleate.

13. Process of claim 8, wherein said cultivation is carried out for a period of from 2 to 8 days.

14. Process of claim 2, wherein said carbon source is an n-paraffin having from 13 to 18 carbon atoms.

15. Process of claim 1, wherein said carbon source is selected from the group consisting of an n-paraffin having from 10 to 20 carbon atoms, kerosene citric acid, fumaric acid, maleic acid, acetic acid, pyruvic acid, crotonic acid, maleic acid, α-ketoglutaric acid, ethanol, propyl alcohol, fatty acid having 10 to 20 carbon atoms, and mixtures thereof.

16. Process of claim 1, wherein said nutrient medium contains a nitrogen source selected from the group consisting of ammonia, ammonium chloride, ammonium sulfate, ammonium nitrate, ammonium carbonate, ammonium phosphate, and ammonium acetate.

17. Process of claim 1, wherein said nutrient medium contains an inorganic material selected from the group consisting of potassium dihydrogen phosphate, dipotassium hydrogen phosphate, magnesium sulfate, ferrous sulfate, manganese sulfate, and calcium carbonate.

18. Process of claim 1, wherein said nutrient medium further comprises peptone, meat extract, yeast extract, cornsteep liquor, casein hydrolysates, or methionine.

19. Process of claim 9, wherein said pH of said medium is controlled by the addition of aqueous ammonia, sodium hydroxide, potassium hydroxide or calcium carbonate.

20. Process of claim 1, wherein said medium is passed after cultivation through an acidic cation-exchange resin.

References Cited

UNITED STATES PATENTS

| | | | |
|---|---|---|---|
| 3,511,752 | 5/1970 | Tanaka et al. | 195—28 R |
| 3,595,751 | 7/1971 | Nakayama et al. | 195—47 |
| 3,598,701 | 8/1971 | Tanaka et al. | 195—28 |

OTHER REFERENCES

Shah et al.: "Agr. Biol. Chem.," vol. 31, pp. 645–50, 1967.

A. LOUIS MONACELL, Primary Examiner

G. M. NATH, Assistant Examiner

U.S. Cl. X.R.

195—29, 30, 49